Jan. 27, 1942. T. THEODORSEN 2,270,912
COWLING FOR AIRCRAFT
Filed July 1, 1938  2 Sheets-Sheet 1
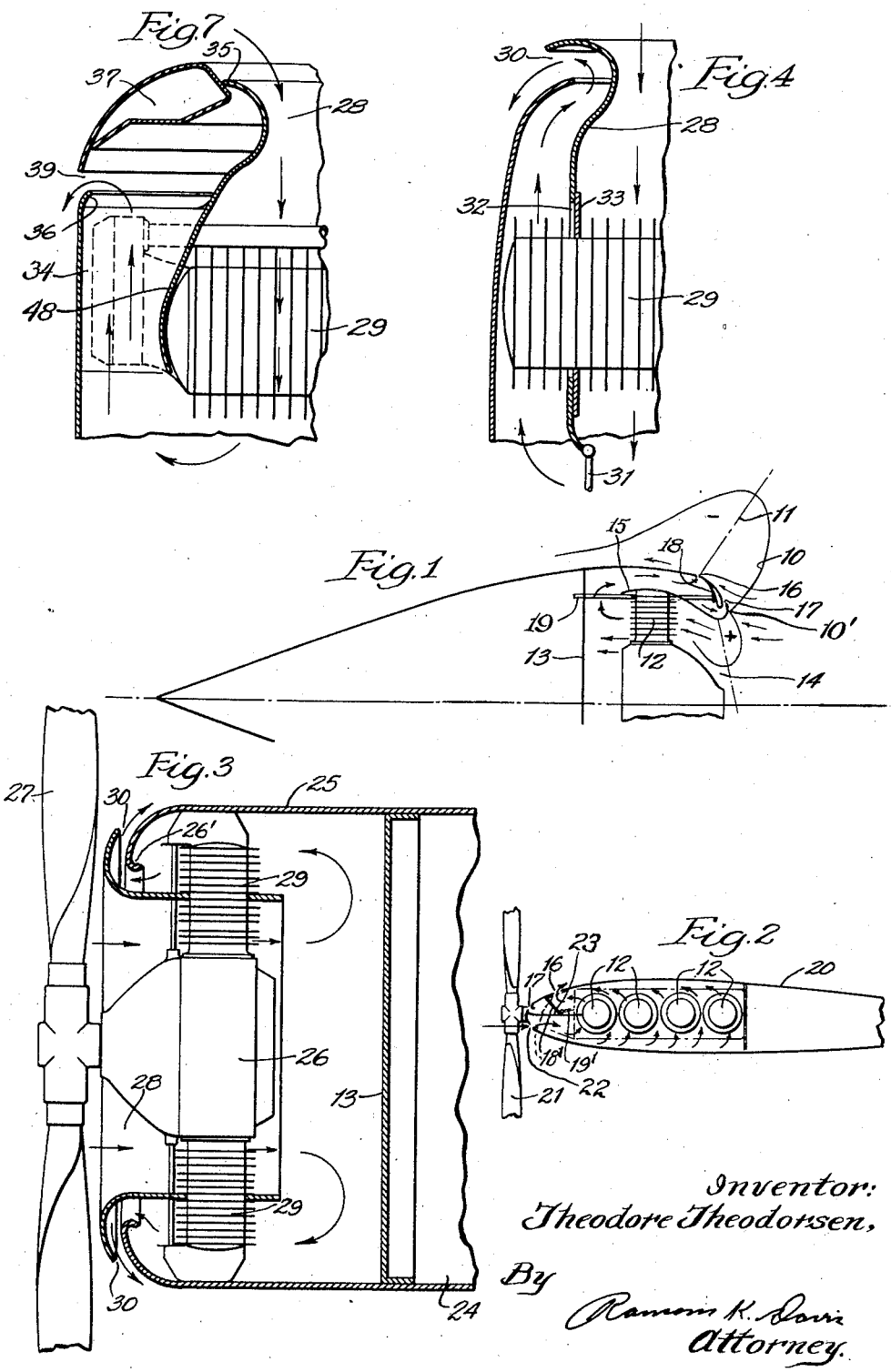
Inventor:
Theodore Theodorsen,
By Ramsom K. Davis
Attorney.

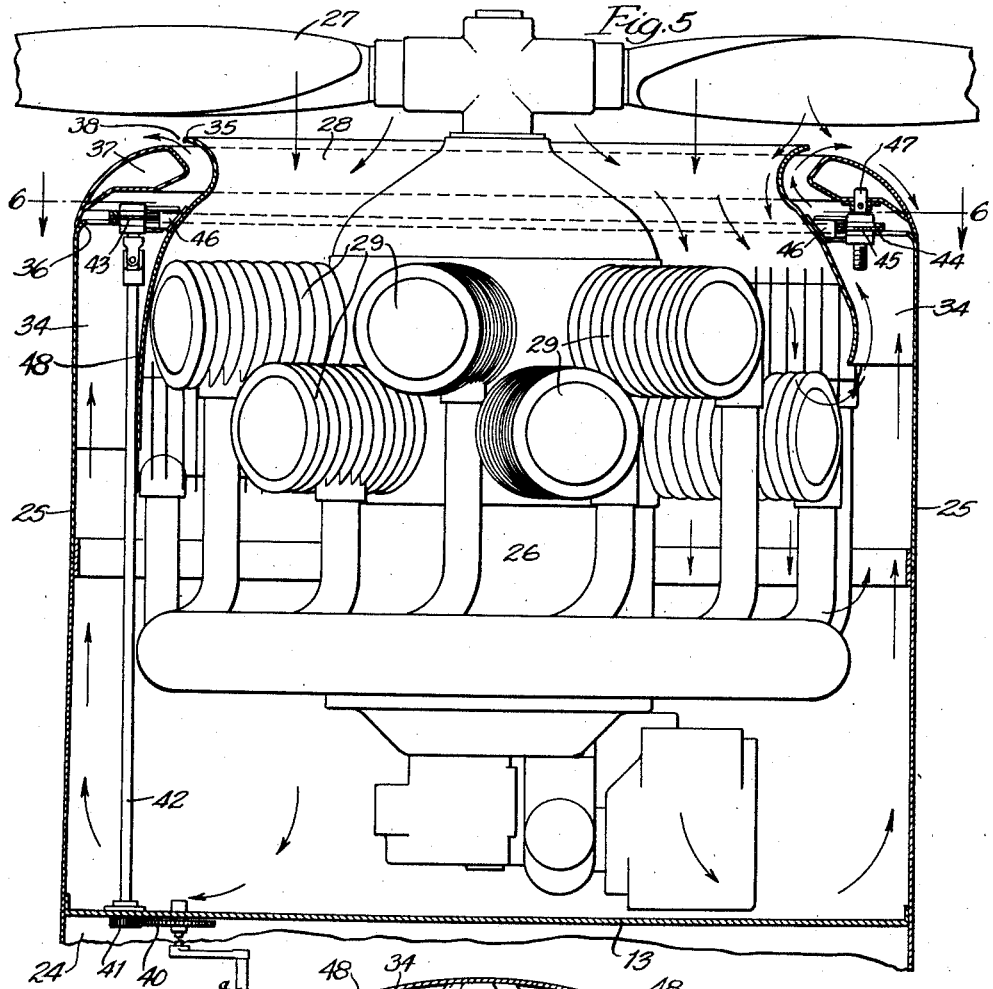

Patented Jan. 27, 1942

2,270,912

UNITED STATES PATENT OFFICE 2,270,912

COWLING FOR AIRCRAFT

Theodore Theodorsen, Hampton, Va.

Application July 1, 1938, Serial No. 216,945

24 Claims. (Cl. 244—130)

(Granted under the act of March 3, 1883, as amended April 30, 1928; 370 O. G. 757)

This application is a continuation in part of my co-pending application Serial No. 60,782, Cowling for aircraft, filed January 25, 1936.

This invention relates to aircraft motor cowling and has for its principal object to provide simple means whereby aircraft motors may be effectively cooled both at high and low forward speed with a minimum disturbance of the airflow and a minimum drag at high speed and with a maximum flow of air for cooling at low speed.

A further object of the invention is to provide an improved adjustable cowling whereby the flow of cooling air may be adjusted to meet the conditions for minimum drag at high speed or for maximum flow of air at low forward speed.

A further object is to provide adequate cooling at high speed with a very low drag.

A further object is to provide a very large cooling effect at low forward speed for takeoff, climb, or ground running.

A further object is to provide a single cooling air outlet at a compromise position between the position providing the best cooling effect at low forward speed and the position providing low drag at high speed constituting a single slot structure operating advantageously under both low and high speed conditions.

A still further object of the invention is the provision of a cowling or nacelle of the character described which is so constructed that the cooling air is caused to flow rearwardly over the engine in a central stream and then forwardly in an annular stream surrounding the central stream under the combined influence of pressure and suction.

Further objects, advantages, and capabilities of the invention will appear from the following description of specific embodiments thereof, taken in conjunction with the accompanying drawings, in which:

Fig. 1 is a fragmentary section of a motor nacelle including a motor and a cowling embodying my invention, together with an illustrative graphical showing of the negative pressure adjacent the nose of the nacelle.

Fig. 2 is a sectional view of a wing structure provided with a flat type engine and an embodiment of my improved cowling.

Fig. 3 is a fragmentary section of the forepart of a fuselage provided with an engine and an embodiment of my improved cowling.

Fig. 4 is a fragmentary sectional view showing a cowling similar to that shown in Fig. 3, which is adjustable.

Fig. 5 is a sectional plan view of the forepart of a fuselage equipped with a still further embodiment of my invention.

Fig. 6 is a fragmentary sectional view thereof taken on the line 6—6 of Fig. 5.

Fig. 7 is a fragmentary view corresponding to Fig. 5, showing the cowling in a different state of adjustment.

Referring to the drawings and particularly to Fig. 1, I have discovered that for most streamline bodies there is a zone of high negative pressure very close to the forward end of the body when the same is subjected to a stream of air induced by a propeller or by motion through the air. This condition is shown graphically in Fig. 1, in which the upper part of the graph line 10 indicates negative pressure and the lower part positive pressure. It will be noted that immediately in front of the body the pressure is positive and that the negative pressure rises steeply at the nose of the body to a maximum which is quite close to the forward end. The negative pressure then falls sharply as shown by the graph 10 to the left of the slanting line 11, which corresponds to the maximum negative pressure. The point of transition between the positive and negative pressures occurs quite close to the front of all aerodynamic bodies. The zone of negative pressure lies forward of the cylinders 12 of the motor, at least when there is a fairly steep forward curvature of the body. It may here be noted that the location of the zone of high negative pressure and the position of maximum negative pressure corresponding to the line 11 depends upon the contour of the aerodynamic body. Thus, high negative pressure is associated with high curvature or with relatively sharply curved surfaces or contours. By means of a fairly abruptly curved formation, as shown in Fig. 1, it is quite easy to have the position of maximum negative pressure quite close to the front of the aerodynamic body. The negative pressure thus obtained may be very substantial. Thus, as shown graphically in Fig. 1, the maximum negative pressure may be double that of the maximum positive pressure, which may be taken as equivalent to the dynamic pressure or pressure of impact for the speed of travel, and greater differences of magnitude may be obtained with surfaces of even greater curvature. The motor is housed in the forward part of the nacelle in a chamber, the rear side of which is closed by a vertical wall 13. Cooling air enters at the front through an opening 14 and passes around a wall 15 over the fins of the cylinders 12. It will of course be understood that the radiator of a liquid cooled motor may, if desired, be substituted for the finned cylinders of an air cooled motor, as shown. The cooling air then moves forwardly and is emitted forwardly of the engine at a point or points close to the nose of the nacelle. I may provide two slots 16 and 17 for the discharge of the air at different points in or ahead of this zone of high negative pressure. Preferably one of the discharge slots, for example 16, is located approximately at the point of maximum negative pressure. The discharge slot 17 is located substantially forward of the slot 16 at a point adjacent or ahead of the forward extremity of the zone of negative pressure. In other words, the outlet slot 17 may be located adjacent the point of transition 10' from positive to negative pressure at the forward end of the body. I provide means for controlling the discharge of the air from the slot 16 or the slot 17, as may be desired. For this purpose I may provide an axially movable ring which can be located by suitable actuating means such as the arms 19, so as to close the slot 16 or the slot 17, as may be desired. Air is discharged through the slot 16 during take-off and during steep climbing and during other conditions where the cooling of the motor requires a large airflow while the aircraft has a relatively low forward speed through the air.

It will be readily seen from Fig. 1 that when the slot 16 is in use, a large negative pressure or suction is exerted on the slot 16 and extends into the interior of the cowling so that the amount of air which is caused to circulate around the cylinders 12 approaches the maximum attainable at that particular forward speed. Under conditions of cruising or high speed flight, however, where there is no necessity for the maximum pressure difference at that speed, to create the needed flow of air over the cylinders, the cooling air is discharged from the slot 17. This discharge occurs very close to the nose of the nacelle and to the air inlet opening at a point adjacent or ahead of the forward extremity of the zone of negative pressure, in a converging or accelerating airflow. Behind the position of maximum negative pressure the airflow diverges. The air is discharged at a position where it exercises the minimum disturbing effect on the flow of the air over the surface of the nacelle. It is to be understood that any suitable pressure baffling means, not completely shown, may be provided to cause the cooling air to flow between the fins of the cylinders 12 so that the airflow is restricted to the immediate vicinity of the effective radiating surface and must pass over this surface before reaching the outlet.

In the embodiment of the invention shown in Fig. 2, the engine cylinders 12 are arranged in line and are mounted within a wing structure 20, the propeller 21 being located in front of the wing. I provide an opening 22 adjacent the axis of the propeller and on one side of the cylinders 12, for example, the under side. The air is directed rearwardly toward the cylinders 12 by a baffle plate 23, and after passing through the fins of the cylinders 12, the air passes forwardly and is discharged through openings 16 or 17 adjacent the forward edge of the wing. These openings are located in substantially similar relation to the position of maximum negative pressure to that for the corresponding slots in the modification of Fig. 1. The discharge of air through the opening 16 or opening 17 is controlled by means of a movable flap 18' which can be thrown to its full line or dotted line position by means of a rod 19'.

Referring to the embodiment of the invention shown in Fig. 3, 24 relates to an aircraft fuselage, the forward part of which serves as a cowling 25 in which is located a radial engine 26. The forward edge of the cowling 25 is curved inwardly as indicated at 26', terminating in an annular formation of considerable diameter. Rearwardly of the propeller 27 is mounted an annular air inlet member 28. The main cylindrical portion of the inlet member 28 is located within the cowling 25 and coincides with an intermediate position between the inner and outer ends of the motor cylinders 29. The forward end of the annular air inlet member 28 flares outwardly around the inturned forward extremity 26' of the cowling 25 and in spaced relation thereto to provide a discharge slot 30. In this embodiment of the invention, air flows inwardly through the air inlet 28 owing to the movement of the fuselage through the air or owing to the airflow created by the propellers 27. This incoming air passes between the fins at the bases of the cylinders 29 and is finally discharged through the annular slot 30. This annular slot may be located near the nose of the fuselage at a point subjected to large negative pressure or suction to enhance the air circulation over the cylinders 29, or at a point further forward suitable for giving the desired airflow with minimum drag, or if desired, at some intermediate point representing a compromise between these two desirable characteristics. When the discharge slot 30 is located at an extreme forward position, where the airflow is rapidly accelerating, the air discharged thereby has little disturbing effect upon the flow of air over the exterior surface of the fuselage to the rear thereof.

The embodiment of the invention shown in Fig. 4 is substantially similar to that shown in Fig. 3. However, the annular air inlet member 28 is movable so as to adjust the opening of the slot 30. This movement is effected by means of rods 31 secured to the inlet member 28 and is permitted by slots 32 within which are located the cylinders 29. The cylinders 29 carry plates 33, which prevent short circuiting of the air through the slots 32.

In the embodiment of the invention shown in Figs. 5, 6, and 7, the fuselage 24, the propeller 27, the cowling 25, and the fire wall 13 have substantially the same relation as shown in Fig. 3. Air is admitted through an annular air inlet member 28 over the fins of cylinders 29, and passes forwardly through passages 34 towards a very wide slot which exists between the forward edge 35 of the air inlet member 28 and the forward edge 36 of the cowling 25. This wide slot is partly occupied by a ring member 37 which is adapted to be moved into a rearward position as shown in Fig. 5 so that the air is discharged through a forward slot 38, or into a forward position, as shown in Fig. 7, so that the air is discharged through a slot 39 somewhat to the rear thereof. The slots 38 and 39 are so located that they substantially correspond to the slots 17 and 16 respectively, which have been described above. The slot 39 is employed for takeoff steep climbing, or other operations in which a maximum airflow over the cylinders at a given low forward speed is desired, and it is preferably located at the point of maximum negative pressure or suction corresponding to the line 11 of Fig. 1. This negative pressure may be as much as three times the positive pressure when the forward curvature of the cowling is abrupt. This point corresponds to the position of maximum relative air velocity over the body and generally occurs at a point where the curvature of the body is quite pronounced. The slot 38 corresponds to a position adjacent or ahead of the forward extremity of the zone of negative pressure or suction and provides airflow adequate for cruising or high speed flight. Owing to its location quite close to the forward edge of the fuselage, the air emitted through the slot 39 has a minimum disturbing effect on the accelerating airflow over the surface of the fuselage and consequently corresponds to a point of emission which provides for the adequate cooling of the motor cylinders with a minimum drag. This point should be substantially ahead of the pilot of maximum air velocity and maximum negative pressure and adjacent the forward extremity of the zone of negative pressure. The zone of negative pressure and the positions above referred to may be established by appropriate pressure measurements.

The movable ring 37 can be actuated by any suitable means, for example by the hand crank 39ª, which may be mounted at a convenient position for actuation by the pilot. The crank 39ª carries a pinion 40 which meshes with the pinion 41 located on the rear end of a shaft 42. The shaft 42 extends forwardly through the cowling 25 and is connected to a sprocket wheel 43 located near the position of the ring 37. A chain 44 extends around the sprocket wheel 43 and around a plurality of sprocket wheels 45 arranged in circumferential series immediately behind the ring member 37. The sprockets 45 are rotatably mounted on structures 46 carried on the outer side of the air inlet member 28. The ring member 37 rigidly carries a series of rearwardly projecting screws 47 which are threaded into central tapped openings in sprockets 45. It will be readily understood that when the crank 39ª is rotated in one direction, the chain 44 will be rotated in the opposite direction and that the corresponding rotation of the sprocket wheels 45 will cause the ring member 37 to move to one of its extreme positions. It may be moved, at will, to its other extreme position by turning the crank 39ª in the opposite direction.

It will be understood that in Figs. 5, 6 and 7, pressure type baffles, not shown, may be provided to restrict the flow of air entering through the inlet member 28 to the immediate vicinity of the heated surfaces. In this arrangement, the cooling of all of the heated surfaces all the way to the outermost portions of the cylinder heads is effected by the flow of air from the front toward the rear. After passage over the heated surfaces, the air is led forward through the air ducts 34 and out the outlet 38 or 39 without again coming in contact with the engine radiating surfaces. The air passages 34 are separated by continuous walls 48 from the heat radiating surfaces and the incoming air. As will be seen in Fig. 6, the passages 34 occupy spaces between the cooling surfaces of the engine and are separated therefrom by walls 48.

Although the invention has been described in connection with the specific details of the preferred embodiments thereof, it must be understood that such embodiments are not intended to be limitative of the invention and that various modifications may be made therein without departing from the scope of the invention.

The invention described herein may be manufactured and used by or for the Government of the United States of America for governmental purposes without the payment of any royalties thereon or therefor.

I claim:

1. In an aircraft including a low drag housing, in combination, an engine having heat radiating means, means defining a cooling air inlet at a position of positive pressure for passing cooling air over said heat radiating means, means defining a plurality of outlets located toward the front of said housing, for discharging said cooling air after passage over said heat radiating means, one of said outlets being located adjacent the forward extremity of the zone of negative pressure, and the other outlet being located adjacent the point of maximum negative pressure, and means for selectively closing either of said outlets.

2. In an aircraft, in combination, heat radiating means, a low-drag housing enclosing said heat radiating means, an inlet for admitting cooling air into said housing, means defining a plurality of air outlets from said housing located in positions of relatively different pressure lower than the pressure at said inlet, and means for selectively varying the relative size of said outlets.

3. In an aircraft, in combination, heat radiating means, a low-drag housing enclosing said heat radiating means, means defining an inlet at a position of positive pressure for admitting cooling air into said housing, means defining a plurality of air outlets from said housing at positions of relatively different pressure and in a zone of negative pressure, and means for selectively closing said outlets.

4. In an aircraft, in combination, heat radiating means, a low-drag housing enclosing said heat radiating means, means defining an inlet at a position of positive pressure for admitting cooling air into said housing, means defining an air outlet from said housing located in a position substantially ahead of the point of maximum negative pressure, means defining a second air outlet located adjacent the point of maximum negative pressure, and means for selectively closing said outlets.

5. In a cooling system for an aircraft internal combustion engine, in combination, an air cooled internal combustion engine arranged in one or more rows about a central crankcase, an annular streamlined outer wall enclosing said engine, a partition closing the rear end portion of said outer wall, an inner annular wall terminating short of said partition and provided with an annular air-intake opening located centrally thereof, the front end of said outer wall terminating short of the front end of said inner wall providing an air-outlet opening therebetween, whereby the general direction of the cooling air flow will be rearwardly as it enters through said intake opening, until deflected by said partition reversing its flow to the front and out through said outlet opening.

6. In a cooling system for an aircraft internal combustion engine, in combination, an air cooled internal combustion engine arranged in one or more rows about a central crankcase, an annular streamlined outer wall enclosing said engine, a partition closing the rear end portion of said outer wall, an inner annular wall terminating short of said partition and provided with an annular air-intake opening located centrally thereof, the front end of said outer wall terminating short of the front end of said inner wall providing an air-outlet opening therebetween, whereby the general direction of the cooling air flow will be rearwardly as it enters through said intake opening, until deflected by said partition reversing its flow to the front and out through said outlet opening, and means for controlling the area of said outlet opening.

7. In a cooling system for an aircraft internal combustion engine, in combination, an air cooled internal combustion engine provided with outer-cylinder head portions and inner-cylinder and crank-case portions, an outer annular streamlined wall surrounding the whole engine structure, a partition closing the rear end of said outer annular wall, an inner annular wall surrounding the front portion of said engine terminating short of said partition and arranged in spaced relation to said outer annular wall and the crank-case portions of said engine, the annular space between said walls constituting a cooling air outlet passage housing the cylinder-head portions of the engine and the substantially annular space between said inner wall and said crank-case portion of said engine surrounded by said inner wall constituting a cooling air inlet passage housing the cylinder and crank-case portions of the engine, whereby the cooling air will flow rearwardly through the air inlet passage and around the cylinder and crank-case portions of the engine until deflected by said partition reversing its flow to the front around the cylinder-head portions of the engine and out through said air outlet passage.

8. In a cooling system for an aircraft internal combustion engine, in combination, an air cooled internal combustion engine provided with outer cylinder-head portions and inner cylinder and crank-case portions, an outer annular streamlined wall surrounding the whole engine structure, a partition closing the rear end of said outer annular wall, an inner annular wall surrounding the front portion of said engine and terminating short of said partition and arranged in spaced relation to said outer annular wall and the crank-case portions of said engine, the annular space between said walls constituting a cooling air outlet passage housing the cylinder-head portions of the engine and the substantially annular space between said inner wall and said crank-case portions of said engine surrounded by said inner wall constituting a cooling air inlet passage housing the cylinder and crankcase portions of the engine, whereby the cooling air will flow rearwardly through the air inlet passage and around the cylinder and crank-case portions of the engine until deflected by said partition reversing its flow to the front around the cylinder-head portions of the engine and out through said air outlet passage, and means for controlling the outlet opening of said air outlet passage.

9. In a cooling system for an aircraft internal combustion engine, the combination of a cowling of streamline configuration surrounding the engine and having an inwardly extending forward edge, a partition closing the rear end of said cowling, an inner member terminating short of said partition arranged within said cowling concentrically thereof and provided with an air intake opening, said member having an outwardly extending forward edge overlapping the forward edge of said cowling to provide an outlet opening disposed adjacent to the streamline of said cowling, whereby the cooling air will flow rearwardly through said member and around the engine, thence forwardly through the space between said member and said cowling and thence through said opening.

10. In an automotive vehicle having an engine, in combination, heat radiating means associated with said engine, a housing enclosing said heat radiating means and having an air inlet and an air outlet, the inlet being located ahead of the outlet, and baffle means extending from the inlet to a position rearward of said outlet, whereby the current of cooling air is caused to pass rearwardly and then forwardly from inlet to outlet in flowing over said heat radiating means.

11. In an automotive vehicle having an engine, in combination, heat radiating means associated with said engine, a housing enclosing said heat radiating means and having an air inlet and an air outlet, both located ahead of the heat radiating means, and baffle means within the housing arranged to cause the current of cooling air to flow rearwardly over said heat radiating means and then forwardly on its way to the outlet.

12. In an aircraft having an engine provided with cooling fins, in combination, a streamlined housing enclosing said engine, said housing having an air inlet and an air outlet, both located ahead of the engine, and baffle means within the housing arranged to cause the current of cooling air to flow rearwardly over said cooling fins and then forwardly on its way to the outlet.

13. In an aircraft having an engine, radiating means for said engine, a streamlined housing of generally circular section enclosing said engine, said housing having an inwardly curved lip of considerable radius at its forward end, a tubular air inlet member having an outwardly turned lip located forwardly of the first said lip whereby an air outlet is provided between said lips, means slidably supporting said air inlet member whereby the effective size of the discharge opening can be adjusted, and means within said housing for causing the air passing from the inlet to the outlet to flow past said radiating means.

14. In an aircraft having an engine, radiating means for said engine, a streamlined housing of generally circular section enclosing said engine, said housing having an inwardly curved portion at its forward end terminating in a rearwardly extending lip of substantial radius, a tubular air inlet member having an outwardly turned lip located forwardly of the first said lip whereby an air outlet is provided between said lips, and means within said housing for causing the air passing from the inlet to the outlet to flow past said radiating means.

15. In aircraft, a power plant comprising an engine embraced within a cowling system, said system having one air opening communicating with one side of the engine and having second and third air openings both communicating with the other side of the engine, said openings being so located in the system that the pressure difference, during and due to aircraft flight, is relatively great as between the first and second openings and is relatively small as between the first and third openings, and means for selectively changing the effective area of the second and third openings, said openings providing for cooling air entrance to and egress from the cowling interior.

16. In aircraft, a power plant comprising an engine embraced within a cowling system, said system having one air opening communicating with one side of the engine and having second and third air openings both communicating with the other side of the engine, said openings being so located in the system that the pressure difference, during and due to aircraft flight, is relatively great as between the first and second openings and is relatively small as between the first and third openings, and co-incidentally operable means for reciprocally closing the second opening and increasing the third and vice-versa, said openings providing for cooling air entrance to and egress from the cowling interior.

17. In aircraft, a power plant comprising an engine having a propeller forward thereof, a nose cowl annulus embracing the engine and having an inturned air entraining leading edge between the propeller and engine cylinders, air therefrom being adapted to pass the engine cylinders for cooling same, an intermediate cowl annulus having its leading edge spaced from the nose cowl to form therewith a forward air exit annulus, a rear cowl annulus having its leading edge spaced from the trailing edge of the intermediate cowl to form therewith a rear air exit annulus, said exit annuli being in zones of extreme low pressure and moderately low pressure in the aggregate cowl profile, and means for selectively controlling the effective area of said exit annuli.

18. In aircraft, a power plant comprising an engine having a propeller forward thereof, a nose cowl annulus embracing the engine and having an inturned air entraining leading edge between the propeller and engine cylinders, air therefrom being adapted to pass the engine cylinders for cooling same, an intermediate cowl annulus having its leading edge spaced from the nose cowl to form therewith a forward air exit annulus, a rear cowl annulus having its leading edge spaced from the trailing edge of the intermediate cowl to form therewith a rear air exit annulus, said exit annuli being in zones of extreme low pressure and moderately low pressure in the aggregate cowl profile, and means for selectively controlling the effective area of said exit annuli, said means comprising mechanism for moving the intermediate cowl forwardly to close and open the forward and rearward exit annuli respectively, and for moving said intermediate cowl rearwardly to open and close the forward and rearward exit annuli respectively.

19. In aircraft, an enclosed cowling in the air stream adapted for airflow therethrough and thereover, having an air entrance opening in a relatively high pressure zone thereon, and having air exit openings respectively in extreme low pressure and moderate low pressure zones thereon, means for closing said exit openings, and mechanism to operate said closing means, reciprocally to open one exit opening and close the other and vice-versa.

20. In aircraft, an enclosed cowling in the air stream adapted for airflow therethrough and thereover, having an air entrance opening in a relatively high pressure zone thereon, and having air exit openings respectively in extreme low pressure and moderate low pressure zones thereon, means for closing said exit openings, and mechanism to operate said closing means, reciprocally to open one exit opening and close the other and vice-versa, said means comprising a member slidable to simultaneously close one opening and to open the other.

21. In an automotive vehicle having an engine and heat radiating means associated with said engine, in combination, low drag housing means enclosing said heat radiating means and having an air inlet and an air outlet, said inlet being located in a nose portion of said housing means and said outlet being located in a forward part of the housing means in a zone of high negative pressure created by the contour of said housing means, said radiating means being located in the path of the air flowing from the inlet to the outlet.

22. In an automotive vehicle having an engine and heat radiating means associated with said engine, in combination, a housing enclosing said heat radiating means and having an air inlet and an air outlet, said inlet being ahead of said outlet and said outlet being ahead of the heat radiating means and immediately adjacent the front end of the housing, said radiating means being located in the path of the air between the inlet and the outlet.

23. In an aircraft including a low drag housing having a forward end portion providing a zone of high positive pressure, an engine having heat radiating means within said housing, means defining a cooling air inlet to said housing at said zone of high positive pressure, means defining an outlet from said housing between said inlet and said heat radiating means for discharging said cooling air after passage over said heat radiating means and at a point adjacent said forward end of the housing and the juncture of the zone of positive pressure and the zone of negative pressure and adjacent the forward extremity of said zone of negative pressure when the aircraft is in normal cruising attitude, whereby drag developed by the exhaust of the cooling air from the housing is reduced.

24. In an aircraft including a low drag housing having a forward end portion providing a zone of high positive pressure, an engine having heat radiating means within said housing, means defining a cooling air inlet to said housing at said zone of high positive pressure, means defining an outlet from said housing between said inlet and said heat radiating means for discharging said cooling air after passage over said heat radiating means and at a point adjacent said forward end of the housing in a position definitely ahead of the point of maximum negative pressure when the aircraft is in normal cruising attitude, whereby drag developed by the exhaust of the cooling air from said housing is reduced.

THEODORE THEODORSEN.